(12) United States Patent
Bauer

(10) Patent No.: US 9,702,435 B2
(45) Date of Patent: Jul. 11, 2017

(54) PLANETARY GEAR UNIT

(71) Applicant: Robert Bosch GmbH, Stuttgart (DE)

(72) Inventor: Gerhard Bauer, Witten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 155 days.

(21) Appl. No.: 14/355,751

(22) PCT Filed: Oct. 13, 2012

(86) PCT No.: PCT/EP2012/004292
§ 371 (c)(1),
(2) Date: May 1, 2014

(87) PCT Pub. No.: WO2013/064208
PCT Pub. Date: May 10, 2013

(65) Prior Publication Data
US 2014/0256502 A1    Sep. 11, 2014

(30) Foreign Application Priority Data

Nov. 4, 2011    (DE) .................... 10 2011 117 656

(51) Int. Cl.
*F16H 57/00*    (2012.01)
*F16H 1/28*    (2006.01)
(Continued)

(52) U.S. Cl.
CPC .............. *F16H 1/28* (2013.01); *F03D 15/00* (2016.05); *F16H 1/46* (2013.01); *F16H 57/021* (2013.01);
(Continued)

(58) Field of Classification Search
CPC ... F16H 2057/02078; F16H 2200/2007; F03D 11/02; F05B 2260/40311
See application file for complete search history.

(56) References Cited

U.S. PATENT DOCUMENTS 8,376,708 B2 *    2/2013    Patel ................... F03D 11/0008
                                                  290/55
2011/0033299 A1 *    2/2011    Leimann ................. F03D 11/02
                                                  416/170 R
(Continued)

FOREIGN PATENT DOCUMENTS

DE    10318945 B3 *    10/2004    ............... F16H 1/28
EP    1 240 443 B1    4/2003
(Continued)

OTHER PUBLICATIONS

International Search Report corresponding to PCT Application No. PCT/EP2012/004292, mailed Nov. 30, 2012 (German and English language document) (5 pages).

*Primary Examiner* — Tisha Lewis
(74) *Attorney, Agent, or Firm* — Maginot, Moore & Beck, LLP

(57) ABSTRACT

A planetary stage of a planetary gear unit with a gearbox housing includes a ring gear, at least one planet gear, and a sun gear, which are rotatably positioned. The ring gear is connected via a tappet to a sun gear shaft of an upstream planetary gear stage, and is rotatably mounted in the gearbox housing. The planetary gear unit exhibits increased robustness by connecting the ring gear on a side opposite the tappet to a ring gear support that is seated in the gearbox housing.

13 Claims, 2 Drawing Sheets

(51) Int. Cl.
    *F16H 1/46*        (2006.01)
    *F16H 57/021*     (2012.01)
    *F03D 15/00*      (2016.01)
    *F16H 57/02*      (2012.01)

(52) U.S. Cl.
    CPC ............... *F05B 2260/40311* (2013.01); *F16H 2057/02078* (2013.01); *Y02E 10/722* (2013.01)

(56) References Cited

U.S. PATENT DOCUMENTS

| | | | | |
|---|---|---|---|---|
| 2011/0142617 A1* | 6/2011 | Mashue | ................ | F03D 7/0224 |
| | | | | 415/229 |
| 2011/0175363 A1* | 7/2011 | Pischel | ................... | F03D 11/02 |
| | | | | 290/55 |
| 2012/0231923 A1* | 9/2012 | Fox | ......................... | F03D 11/02 |
| | | | | 475/337 |
| 2013/0270837 A1* | 10/2013 | Mongeau | ................ | F03D 1/001 |
| | | | | 290/1 C |

FOREIGN PATENT DOCUMENTS

| | | | | |
|---|---|---|---|---|
| WO | 2004/088132 A1 | 10/2004 | | |
| WO | WO2012052023 A1 * | 4/2012 | ............... | F03D 9/00 |

\* cited by examiner

PLANETARY GEAR UNIT

This application is a 35 U.S.C. §371 National Stage Application of PCT/EP2012/004292, filed on Oct. 13, 2012, which claims the benefit of priority to Serial No. DE 10 2011 117 656.3, filed on Nov. 4, 2011 in Germany, the disclosures of which are incorporated herein by reference in their entirety.

The disclosure relates to a planetary stage of a planetary gear unit having a gear mechanism housing, in which an internal gear, at least one planetary gear and a sun gear are arranged rotatably, the internal gear being connected via a driver to an element, in particular a sun gear shaft of a planetary gear stage which is connected upstream, and being mounted rotatably in the gear mechanism housing.

BACKGROUND

A planetary gear unit of this type is known from EP 1 240 443 B1. Said planetary gear unit is designed for a wind power plant and has two planetary stages A1 and A2 which are connected by way of a summing gear mechanism B which is likewise a planetary gear unit. The internal gears of the stage A2 and the summing gear mechanism B are connected to a driver which is mounted rotatably in a gear mechanism housing.

SUMMARY

The disclosure is based on the object of providing a planetary gear unit with increased robustness.

This object is achieved by virtue of the fact that, on the opposite side to the driver, the internal gear is connected to an internal gear support which is mounted in the gear mechanism housing. As a result of this additional mounting, the robustness of the planetary gear unit is increased considerably, it is more rigid torsionally and it is possible to transmit considerably higher power outputs and torques by way of the planetary gear unit according to the disclosure in the case of identical dimensions and other designs in comparison with a planetary gear unit without an internal gear support.

In one development of the disclosure, the internal gear support is mounted in the gear mechanism housing via a support-side tapered roller bearing. A tapered roller bearing has proven particularly suitable for the mounting of the internal gear support, it also being possible, however, for other bearing designs to be used for mounting the internal gear support.

In one development of the disclosure, the driver is mounted in the gear mechanism housing via a driver-side tapered roller bearing. The use of a tapered roller bearing has also proven itself particularly here, it also being possible, however, for other bearing designs to be installed here.

In one development of the disclosure, the driver-side tapered roller bearing and the support-side tapered roller bearing are arranged in a tandem-shaped manner. A tandem-shaped arrangement means that the contact center point lines of the tapered roller bearings run parallel to one another. This refinement makes axial setting or stressing of the two tapered roller bearings possible. In principle, tapered roller bearings make it possible to introduce axial forces and radial forces into the mounting without problems. Here, in a further refinement of the disclosure, the mounting of the internal gear can be prestressed axially. The two-sided prestressed support of the internal gear counteracts possible widening of the internal gear and makes it possible to absorb high axial forces and tilting moments, in particular in the case of a helically toothed toothing geometry. All these refinements contribute to an increase in the robustness of the planetary gear unit and the possibility to transmit higher power outputs and moments.

In one development of the disclosure, the play of the internal gear can be set by way of the support-side tapered roller bearing. The adjustability is advantageous, for example, for the precise setting of the axial prestress. Satisfactory accessibility is achieved by virtue of the fact that the setting has taken place on the side of the internal gear support, because a gear mechanism housing cover is preferably arranged on this side of the planetary gear unit.

In a further refinement of the disclosure, the internal gear is connected in a non-positive and/or positively locking manner to the driver and/or the internal gear support. For example, the internal gear can be braced together with the driver and the internal gear support by way of the threaded bolts and nuts, by the threaded bolts being screwed into threaded blind holes in the driver, penetrating the internal gear and the internal gear support in corresponding bores, and being braced on the internal gear support side from the outside by way of a nut. In this refinement, the structural unit consisting of the driver, the internal gear and the internal gear support can be mounted satisfactorily, it also being possible, moreover, to optionally control the screw connection by way of the cover in the gear mechanism housing, which cover is present on the internal gear support side.

In one development of the disclosure, the planetary gear is mounted in a planet spider, the planet spider being connected to a planetary gear shaft coaxially with respect to the internal gear shaft, and the planet spider being connected to, but in particular being configured in one piece with, a planet spider shaft which is arranged coaxially with respect to the internal gear shaft and is mounted rotatably in the gear mechanism housing. The planet spider is mounted in the gear mechanism housing via a driver-side and a support-side tapered roller bearing. In addition to the internal gear, the planet spider is therefore also mounted on both sides, said mounting likewise contributing to an increase in the robustness of the planetary gear unit, in particular if tapered roller bearings are used. Here, the mounting with the use of tapered roller bearings can be implemented in a structurally favorable manner and can also be mounted and maintained without problems.

In one development of the disclosure, the spider-side tapered roller bearing and the spider support-side tapered roller bearing are arranged in an x-shaped manner with respect to one another. An x-shaped arrangement means that the tapered rollers are oriented in an x-shaped manner with respect to one another. Tapered roller bearings make it possible to introduce axial forces and radial forces into the mounting without problems. Here, in a further refinement of the disclosure, the mounting of the planet spider can be prestressed axially, in order to set the play of the planet spider, in particular. This setting takes place on the side of the internal gear support and can therefore take place simply by way of the removed gear mechanism housing cover.

In a further refinement of the disclosure, the planetary gear unit is a gear mechanism stage of a continuous-flow power plant gear mechanism, in particular an ocean current power plant gear mechanism or a wind power plant gear mechanism. In these applications, in particular, the use of extremely robust and powerful planetary gear units is important and/or appropriate.

BRIEF DESCRIPTION OF THE DRAWINGS

Further advantageous refinements of the disclosure can be gathered from the description of the drawings, in which one exemplary embodiment of the disclosure which is shown in the figures is described in greater detail.

In the figures.

DETAILED DESCRIPTION

Figure 1:
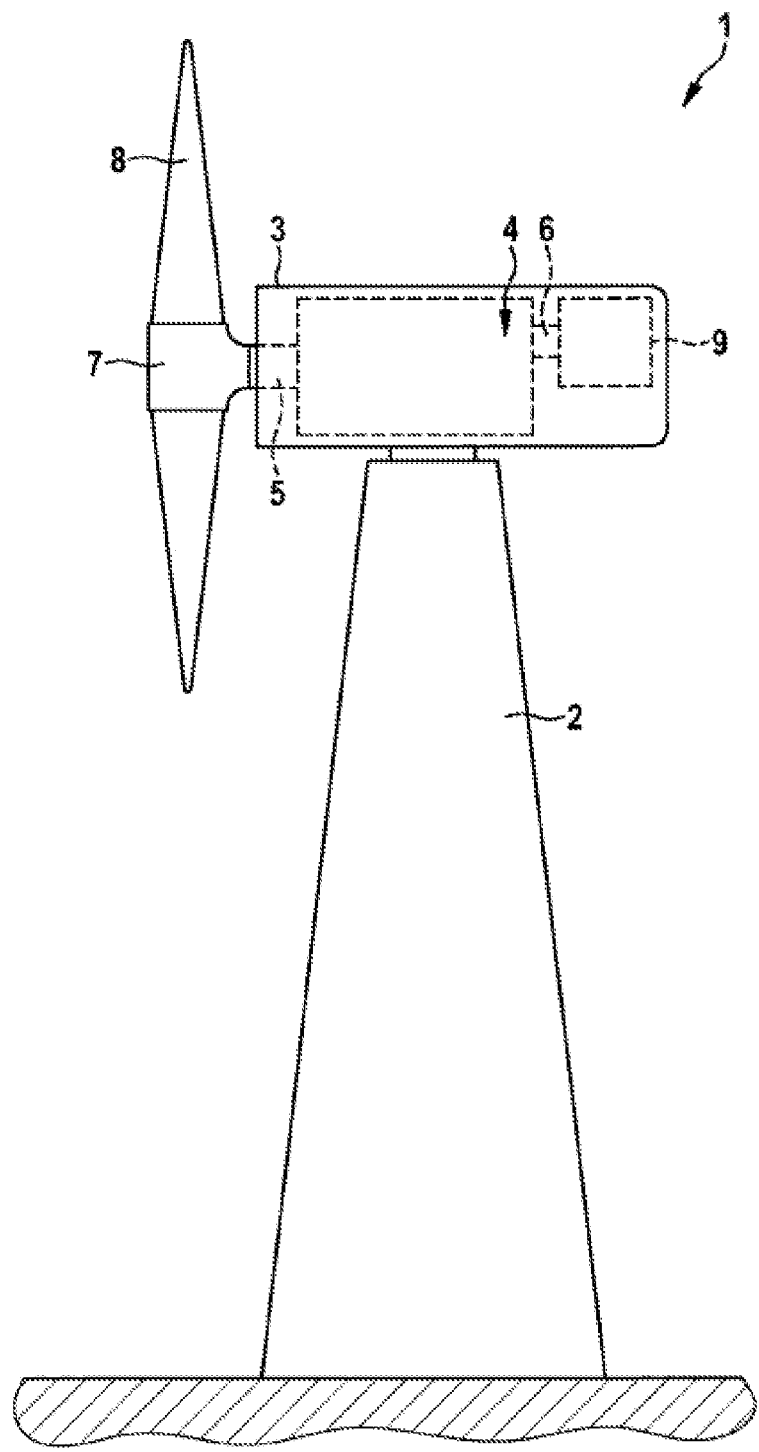
FIG. 1 shows a side view of a wind power plant having a planetary gear unit which is configured according to the disclosure.

FIG. 1 shows a side view of a wind power plant 1 with its essential assemblies. The wind power plant 1 has a tower 2, on which a nacelle 3 in the form of a machine housing which is mounted such that it can be rotated about a vertical axis is arranged. A gear mechanism is fastened in a rotationally fixed manner in the nacelle 3, the gear mechanism 4 having a drive shaft 5 and a driven shaft 6. The drive shaft 5 of the gear mechanism is connected to a hub 7 of a rotor which has a plurality of rotor blades 8. The driven shaft 6 is rotationally connected to a drive apparatus which is to be driven in the form of a generator 9. The gear mechanism 4 is designed in such a way that it converts a slow rotational movement of the drive shaft 5 into a rapid rotational movement of the driven shaft 6.

Electrical energy is generated by means of the wind power plant 1, by the rotor which is set in a rotational movement by the wind introducing the rotational movement into the gear mechanism 4 via the drive shaft 5. The gear mechanism 4 converts the rotational movement into a more rapid rotational movement and, finally, the rapid rotational movement is transmitted via the driven shaft 6 to the generator 9 in order to generate electricity.

Figure 2:
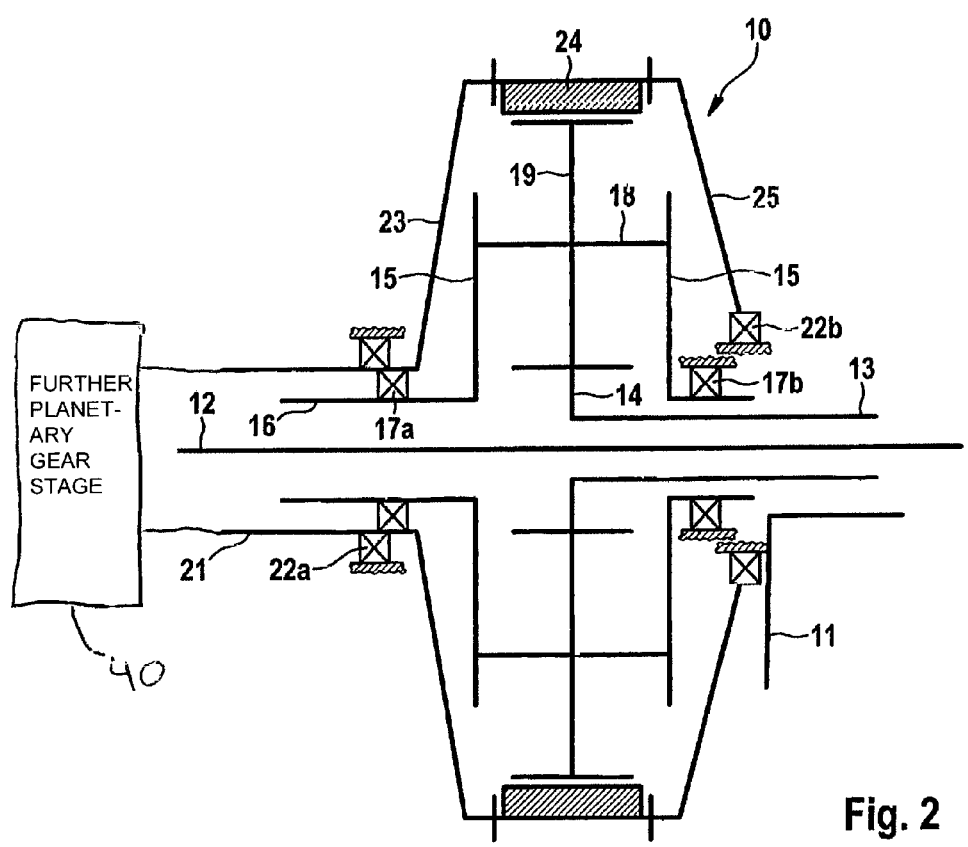
FIG. 2 shows a sectional illustration of the planetary gear unit according to the disclosure with an internal gear support.

FIG. 2 shows a detail of the gear mechanism 4, the detail relating to a planetary gear unit which represents a planetary stage 10 of the gear mechanism 4 and, in particular as a summing gear mechanism B, is a constituent part of the gear mechanism 4.

The planetary stage 10 has a gear mechanism housing 11 (shown in outline form) which is connected, for example screwed, to the housing or housings of the further gear mechanism 4. A central leadthrough tube 12 is arranged in the gear mechanism housing 11, which leadthrough tube 12 is adjoined by a sun gear shaft 13 which supports a sun gear 14. The sun gear shaft 13 is mounted rotatably in the gear mechanism housing 11 and represents an output shaft which is connected to the driven shaft 6 directly or via a spur gear mechanism.

Furthermore, the planetary stage 10 has a planet spider 15 which is connected to a planet spider shaft 16. The planet spider shaft 16 is mounted rotatably in a first bearing which is configured as a first (driver-side) tapered roller bearing 17a. The planet spider 15 is connected to a planetary gear shaft 18, on which a planetary gear 19 is mounted rotatably. On the opposite side to the driver-side tapered roller bearing 17a, the planet spider 15 is mounted in a support-side tapered roller bearing 17b. The tapered roller bearings 17a, 17b are arranged in an x-shaped manner with respect to one another, the tapered roller bearing 17b being additionally settable. For setting, the tapered roller bearing 17b can be adjusted axially, with the result that the axial prestress of the planet spider 15 can be set by way of the x-shaped arrangement of the tapered rollers of the two tapered roller bearings 17a, 17b. The planet spider 15 is preferably of strut-like configuration and, in corresponding bores, supports a total of three planetary gear shafts 18 which are arranged distributed on the circumference and on which in each case one planetary gear 19 is arranged.

The planet spider shaft 16 is in turn surrounded by an element 21, in particular a sun gear shaft of a planetary gear stage 40 which is connected upstream, which is likewise mounted in a driver-side tapered roller bearing 22a. The element 21 which, in the region of the planetary stage 10, is at the same time also the internal gear shaft of said stage is connected to a driver 23 which is connected, in particular screwed, to an internal gear 24 of the planetary stage 10. The internal gear 24 meshes in a known way with the three planetary gears 19 which for their part mesh with the sun gear 14. On the opposite side to the driver 23, the internal gear 24 is connected, in particular screwed, to an internal gear support 25. The screwed connection can be configured, for example, in such a way that threaded bolts are inserted into the driver 23, which threaded bolts penetrate the internal gear 24 and the internal gear support 25 in a bore and are braced by way of nuts on the internal gear support side. The internal gear support 25 is mounted in a tapered roller bearing 22b which is likewise settable. Here, the tapered roller bearings 22a, 22b are arranged in an x-shaped manner with respect to one another, with the result that the prestress onto the internal gear support 25 can be set by way of an axial adjustment of the tapered roller bearing 22b.

As a result of the embodiment which is shown, the planetary stage 10 which is configured in this way has an increased robustness overall and can transmit higher moments.

LIST OF DESIGNATIONS

1 Wind power plant
2 Tower
3 Nacelle
4 Gear mechanism
5 Drive shaft
6 Driven shaft
7 Hub
8 Rotor blade
9 Generator
10 Planetary stage
11 Gear mechanism housing
12 Leadthrough tube
13 Sun gear shaft
14 Sun gear
15 Planet spider
16 Planet spider shaft
17a, 17b Tapered roller bearing
18 Planetary gear shaft
19 Planetary gear
21 Internal gear shaft
22a, 22b Tapered roller bearing
23 Driver
24 Internal gear
25 Internal gear support

The invention claimed is:

1. A planetary stage of a planetary gear unit having a gear mechanism housing, comprising:
 an internal gear;
 at least one planetary gear; and
 a sun gear;
 wherein the internal gear, the at least one planetary gear, and the sun gear are rotatably positioned;
 wherein the internal gear is:

connected via a driver to a sun gear shaft of a further planetary gear stage which is connected upstream; and mounted rotatably in the gear mechanism housing;

wherein, on a side opposite to the driver, the internal gear is connected to an internal gear support that is mounted rotatably in the gear mechanism housing;

wherein the internal gear support is mounted in the gear mechanism housing via a support-side tapered roller bearing;

wherein the driver is mounted in the gear mechanism housing via a driver-side tapered roller bearing; and wherein the driver-side tapered roller bearing and the support-side tapered roller bearing are positioned in a tandem-shaped manner with respect to each other.

2. The planetary stage as claimed in claim 1, wherein the driver is mounted in the gear mechanism housing via a driver-side tapered roller bearing.

3. The planetary stage as claimed in claim 1, wherein a mounting of the internal gear is configured to be prestressed axially, and is further configured to be set with axial play.

4. The planetary stage as claimed in claim 1, wherein a planet spider which receives the at least one planetary gear is mounted in the gear mechanism housing via a driver-side tapered roller bearing and a support-side tapered roller bearing.

5. The planetary stage as claimed in claim 4, wherein the driver-side tapered roller bearing and the support-side tapered roller bearing are positioned in an x-shaped manner with respect to each other.

6. The planetary stage as claimed in claim 4, wherein a mounting of the planet spider is configured to be prestressed axially, and is further configured to be set with axial play.

7. The planetary stage as claimed in claim 1, wherein the planetary stage is a gear mechanism stage of a continuous-flow power plant gear mechanism that is an ocean current power plant gear mechanism or a wind power plant gear mechanism.

8. A wind power plant, comprising:
a wind power plant gear mechanism that includes a planetary stage having:
an internal gear;
at least one planetary gear; and
a sun gear;
wherein the internal gear, the at least one planetary gear, and the sun gear are rotatably positioned;
wherein the internal gear is:
connected via a driver to a sun gear shaft of a further planetary gear stage which is connected upstream; and
mounted rotatably in the gear mechanism housing;
wherein, on a side opposite to the driver, the internal gear is connected to an internal gear support that is mounted rotatably in a gear mechanism housing;
wherein the internal gear support is mounted in the gear mechanism housing via a support-side tapered roller bearing;
wherein the driver is mounted in the gear mechanism housing via a driver-side tapered roller bearing; and
wherein the driver-side tapered roller bearing and the support-side tapered roller bearing are positioned in a tandem-shaped manner with respect to each other.

9. A planetary stage of a planetary gear unit having a gear mechanism housing, comprising:
an internal gear;
at least one planetary gear; and
a sun gear;
wherein the internal gear, the at least one planetary gear, and the sun gear are rotatably positioned;
wherein the internal gear is:
connected via a driver to a sun gear shaft of a further planetary gear stage which is connected upstream; and
mounted rotatably in the gear mechanism housing;
wherein, on a side opposite to the driver, the internal gear is connected to an internal gear support that is mounted rotatably in the gear mechanism housing; and
wherein a mounting of the internal gear is configured to be prestressed axially, and is further configured to be set with axial play.

10. The planetary stage as claimed in claim 9, wherein the driver is mounted in the gear mechanism housing via a driver-side tapered roller bearing.

11. The planetary stage as claimed in claim 9, wherein a planet spider which receives the at least one planetary gear is mounted in the gear mechanism housing via a driver-side tapered roller bearing and a support-side tapered roller bearing.

12. The planetary stage as claimed in claim 11, wherein the driver-side tapered roller bearing and the support-side tapered roller bearing are positioned in an x-shaped manner with respect to each other.

13. The planetary stage as claimed in claim 9, wherein the planetary stage is a gear mechanism stage of a continuous-flow power plant gear mechanism that is an ocean current power plant gear mechanism or a wind power plant gear mechanism.

* * * * *